(12) United States Patent  
Ammar (10) Patent No.: US 8,531,915 B2  
(45) Date of Patent: Sep. 10, 2013

(54) ACOUSTIC AND ULTRASONIC CONCEALED OBJECT DETECTION

(75) Inventor: Danny F. Ammar, Windermere, FL (US)

(73) Assignee: Stalix LLC, Orlando, FL (US)

( * ) Notice: Subject to any disclaimer, the term of this patent is extended or adjusted under 35 U.S.C. 154(b) by 751 days.

(21) Appl. No.: 12/233,469

(22) Filed: Sep. 18, 2008

(65) Prior Publication Data

US 2010/0278008 A1 Nov. 4, 2010

Related U.S. Application Data

(60) Provisional application No. 61/046,430, filed on Apr. 20, 2008, provisional application No. 61/047,182, filed on Apr. 23, 2008.

(51) Int. Cl.
*G01S 15/04* (2006.01)

(52) U.S. Cl.
USPC ............................................. 367/93; 367/87

(58) Field of Classification Search
USPC .................. 367/93, 87; 73/620, 628, 629
See application file for complete search history.

(56) References Cited

U.S. PATENT DOCUMENTS

| | | | | |
|---|---|---|---|---|
| 5,357,063 A | * | 10/1994 | House et al. | 367/14 |
| 5,974,881 A | * | 11/1999 | Donskoy et al. | 73/579 |
| 5,979,240 A | | 11/1999 | Rix et al. | 73/602 |
| 6,870,791 B1 | | 3/2005 | Caulfield et al. | 367/11 |
| 7,053,785 B2 | * | 5/2006 | Akins | 340/693.9 |
| 7,319,639 B2 | | 1/2008 | Heyman | 367/92 |
| 7,532,541 B2 | * | 5/2009 | Govindswamy et al. | 367/88 |
| 7,699,469 B2 | * | 4/2010 | Sebastian et al. | 351/209 |
| 7,796,173 B2 | * | 9/2010 | Lettvin | 348/294 |

OTHER PUBLICATIONS

Felber et al, "Handheld Remote Concealed Weapons Detector: Final Technical Report", National Institutes of Justice/NCJRS, Publication date Feb. 1999.*

Felber et al, "Ultrasound Sensor for Remote Imaging of Concealed Weapons", Meeting date Nov. 18-22, 1996, Boston, MA, SPIE Proceedings vol. 2938.*

* cited by examiner

*Primary Examiner* — Ian Lobo  
(74) *Attorney, Agent, or Firm* — Bey & Cotropia PLLC (57) ABSTRACT

An acoustic/ultrasonic detection system can detect, for example, an object concealed under the clothing of a subject. The system includes a signal generator configured to output an electrical signal. An acoustic/ultrasonic transducer can be configured to convert the electrical signal into an acoustic/ultrasonic signal, transmit the acoustic/ultrasonic signal, receive a reflected acoustic/ultrasonic signal from an object in the target area and convert the reflected acoustic/ultrasonic signal into a received electrical signal. The transducer is at least one of an air-coupled transducer and an electro-magnetic acoustic transducer. The system can also include an acoustic/ultrasonic antenna aperture operatively connected to the transducer and configured to focus the transmitted acoustic/ultrasonic signal to create a narrow beam in the target area, a processor configured to extract object information from the received electrical signal and an object indication device to provide an indication of a detected object based on the extracted object information.

10 Claims, 9 Drawing Sheets

PRIOR ART

FIG. 1

| Ultrasonic Frequency (KHz) | Electromagnetic Frequency (GHz) | Wavelength (mm) |
|---:|---:|---:|
| 20 | 18.2 | 16.5000 |
| 25 | 22.7 | 13.2000 |
| 40 | 36.4 | 8.2500 |
| 100 | 90.9 | 3.3000 |
| 250 | 227.3 | 1.3200 |
| 1,000 | 909.1 | 0.3300 |
| 5,000 | 4545.5 | 0.0660 |
| 10,000 | 9090.9 | 0.0330 |
| 100,000 | 90909.1 | 0.0033 |
| 200,000 | 181818.2 | 0.0017 |
| 500,000 | 454545.5 | 0.0007 |

Parabolic Reflector

Top View · Side View

Side View     Cross-Sectional View     Top View

ACOUSTIC AND ULTRASONIC CONCEALED OBJECT DETECTION

CROSS-REFERENCE TO RELATED APPLICATIONS

This application claims priority from U.S. Provisional Application Ser. No. 61/046,430, filed Apr. 18, 2008 and U.S. Provisional Application Ser. No. 61/047,182, filed Apr. 23, 2008, the disclosures of which are hereby incorporated by reference in their entirety.

BACKGROUND

1. Field

The subject matter presented herein relates to detecting concealed objects in an obscuring medium using acoustic and ultrasonic devices and methods.

2. Description of Related Art

Concealed object detection can be a challenge, for example, to the law enforcement and loss prevention communities. Known screening methods, such as metal detectors, can be ineffective in preventing some concealed objects from being detected, especially if they are made of plastic or liquid materials, for example.

Other known screening systems can use, for example, low level backscatter X-rays, passive and active millimeter waves (MMW) and chemical trace detection. Some screening technologies, for example, those that employ ionizing radiation, may not be acceptable in some circumstances because they can be deemed to be harmful.

SUMMARY

In an exemplary embodiment, a portable acoustic/ultrasonic detection system for detecting a remote object in a target area comprises a signal generator configured to output an electrical signal; at least one acoustic/ultrasonic transducer configured to convert the electrical signal into an acoustic/ultrasonic signal, transmit the acoustic/ultrasonic signal, receive a reflected acoustic/ultrasonic signal from an object in the target area and convert the reflected acoustic/ultrasonic signal into a received electrical signal, wherein the transducer is at least one of an air-coupled transducer and an electromagnetic acoustic transducer; an acoustic/ultrasonic antenna aperture operatively connected to the transducer and configured to focus the transmitted acoustic/ultrasonic signal to create a narrow beam in the target area; a processor configured to extract object information from the received electrical signal; and an object indication means for providing an indication of a detected object based on the extracted object information. The object may be concealed on a subject, for example, under the clothing of a subject.

In an embodiment, the signals are at frequencies from about 15 KHz to about 500 MHz and the acoustic/ultrasonic transducer has a bandwidth of 5 KHz or greater.

In an embodiment, the electrical signal created by the signal generator is a digital pulse. In another embodiment, a digital-to-analog converter is configured to convert the digital pulse into an analog electrical signal. In another embodiment, an analog-to-digital converter configured to convert the received electrical signal into a digital signal.

In an embodiment, the acoustic/ultrasonic antenna aperture is configured to receive an acoustic/ultrasonic signal reflected from an object in the target area. In another embodiment, the acoustic/ultrasonic transducer is configured as a separate acoustic/ultrasonic transmit transducer and acoustic/ultrasonic receive transducer.

In an embodiment, an acoustic/ultrasonic detection system for detecting a remote object in a target area comprises a transmitter configured to create an electrical signal; an acoustic/ultrasonic array comprising at least two acoustic/ultrasonic transducers configured as planar phased arrays and configured to convert the electrical signal into an acoustic/ultrasonic signal and to transmit and receive the acoustic/ultrasonic signal, wherein the transducers are at least one of an air-coupled transducers and an electromagnetic-acoustic transducer; a receiver configured to convert the received acoustic/ultrasonic signal reflected from an object in the target area into a received electrical signal; a processing means configured to extract object information from the received electrical signal; and an object indication means for providing an indication of a detected object based on the extracted object information.

In an embodiment, the processing means is configured to execute at least one of time domain beamforming and frequency domain beamforming.

In an embodiment, the object indication means is at least one of an audible indication and a visual indication. In another embodiment, the visual indication is a reconstructed two-dimensional image of the detected object on a display. In another embodiment, the transmitter is a transmit beamformer. In another embodiment, the transmit beamformer is configured to create a digital pulse.

In an embodiment, a digital-to-analog converter is configured to convert the digital pulse into the electrical signal. In another embodiment, the receiver is a receive beamformer and the processing means is a receive beamforming processing means. In another embodiment, the receive beamformer comprises an analog-to-digital converter configured to convert the received electrical signal into a digital signal. In another embodiment, the transmit beamformer is configured to scan in at least one of a horizontal direction and a vertical direction. In another embodiment, the receive beamformer is configured to scan in at least one of a horizontal direction and a vertical direction.

In an embodiment, the acoustic/ultrasonic array is configured in an enclosure comprising one or more points of entry and one point of exit for a subject to be screened. In another embodiment, the object indication means is at least one of an audible indication and a visual indication and wherein the visual indication is at least one of a reconstructed two-dimensional and three-dimensional image of the detected object on a display.

In an embodiment, at least one of the acoustic/ultrasonic transducers is configured for movement with respect to a subject in an enclosure to create a synthetic aperture.

In an embodiment, an acoustic/ultrasonic detection system for detecting an object in a target area by simultaneously screening multiple subjects comprises a multi-directional array comprising at least three sensors, wherein each sensor is at least one of an electromagnetic-acoustic transducer or an air-coupled transducer and wherein the array is configured to transmit acoustic/ultrasonic signals into the target area and to receive reflected acoustic/ultrasonic signals reflected from an object in the target area; and a processor configured generate a three-dimensional image from the reflected acoustic/ultrasonic signals, the three dimensional image being indicative of the object in the target area.

In an embodiment, a method of simultaneously screening multiple subjects for concealed objects comprises transmitting an acoustic/ultrasonic signal into a screening area wherein at least one subject having an associated object is to be screened; receiving a reflected acoustic/ultrasonic signal from the object when the object is located within the screening area; processing the reflected acoustic/ultrasonic signal to generate a three-dimensional image of the object; and displaying the three-dimensional image; wherein the transmitting and receiving are performed using a multi-dimensional array comprising at least three sensors and wherein the sensors are at least one of an electromagnetic-acoustic transducer or an air-coupled transducer.

In an embodiment, an acoustic/ultrasonic detection system for detecting an object in a subject's shoes comprises a platform on which a subject may stand while wearing shoes to be screened; at least one acoustic/ultrasonic transducer contained in the platform, the acoustic/ultrasonic transducer configured to transmit acoustic/ultrasonic signals into the subject's shoes and receive acoustic/ultrasonic signals from the subject's shoes; a signal processor configured to extract object information from the received acoustic/ultrasonic signals; and an object indication means for providing an indication of a detected object based on the extracted object information.

In an embodiment, an acoustic/ultrasonic detection system for detecting an object on a subject comprises at least one transmitting acoustic/ultrasonic transducer configured to transmit acoustic/ultrasonic waves that propagate along the subject's body, the subject's body being in contact with the transmitting acoustic/ultrasonic transducer; at least one receiving acoustic/ultrasonic transducer configured to receive the transmitted acoustic/ultrasonic waves that propagated along the subject's body; the subject's body being in contact with the receiving acoustic/ultrasonic transducer; a signal processor configured to extract object information from the received acoustic/ultrasonic waves; and an object indication means for providing an indication of a detected object based on the extracted object information.

In an embodiment, the acoustic/ultrasonic waves are at least one of acousto-ultrasonic waves and Lamb and Shear waves.

BRIEF DESCRIPTION OF THE DRAWINGS

As will be realized, different embodiments are possible, and the details disclosed herein are capable of modification in various respects, all without departing from the scope of the claims. Accordingly, the drawings and descriptions are to be regarded as illustrative in nature and not as restrictive. Like reference numerals have been used to designate like elements.

DETAILED DESCRIPTION

Figure 1:
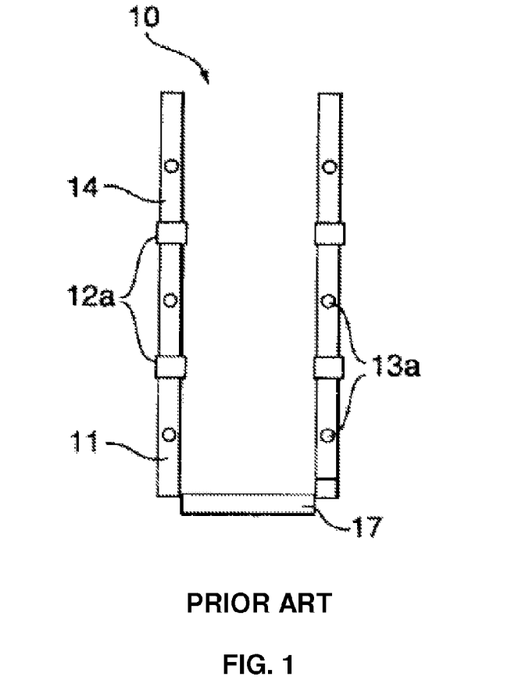
FIG. 1 shows a known ultrasonic screening portal.

FIG. 1 shows an example of a known acoustic portal 10, including a frame 11 of sufficient size for a human subject to move through the portal by walking. Multiple acoustic energy transmitters 12 are positioned in the front side 14, the inside and the back side of the frame 11. Multiple acoustic detectors 13 are positioned in the front side 14, the inside, and the back side of the frame 11. A device 17 to scan shoes is also shown. In this type of portal scanning, the subject can move through the frame, similar to a metal detector. A limitation with this approach is that the subject controls the speed at which he or she moves through the portal and therefore the screening time will vary and may affect probability of detection. A second limitation of this approach is that no 3D images are created to aid in the visual identification of a concealed object; instead this method relies on one directional planar reflections only.

Acoustic and ultrasound systems can operate similarly to radar. However, acoustic waves propagate at the speed of sound while electromagnetic waves propagate at the speed of light. The lower propagation speed of acoustic and ultrasonic waves can allow similar capabilities achieved by radar with high frequency electromagnetic waves without the high cost. Ultrasonic systems can be configured to perform radar-like functions, such as range measurements, velocity measurements, target detection and high resolution imaging. An ultrasonic array can be similar in concept to a phased-array radar system.

As generally used, the acoustic frequency range is from about 20 Hz to 20 KHz. The ultrasonic range is generally from about 20 KHz to about 1 MHz. As used herein, the term acoustic/ultrasonic will denote frequencies in the acoustic and ultrasonic ranges.

Another characteristic of sound waves is that when a sound wave traveling through a medium encounters a boundary with a dissimilar material, a portion of the wave energy will be reflected back and the rest will continue through. The amount of reflection is related to the relative acoustic impedances of the two materials. The reflection coefficient may be calculated as follows:

$$R = (Z_2 - Z_1)/(Z_2 + Z_1)$$

Where
R is the reflection coefficient (in percent)
$Z_1$ is the acoustic impedance of the first medium
$Z_2$ is the acoustic impedance of the second medium From the above equation, it can be seen that as the acoustic impedances of the two materials approach each other, the reflection coefficient decreases. As the materials become dissimilar, as in a boundary between human skin and a metal or plastic objects, the reflection coefficient approaches becomes much stronger.

Acoustic and ultrasonic devices have been used in non-destructive testing (NDT). Generating and detecting ultrasonic waves requires an ultrasonic transducer. Piezoelectric ceramics within ultrasonic transducers generate an "audible note" when an electric signal is applied to them, typically between 10 and 1000 volts to produce the ultrasonic wave. One limitation of some ultrasonic measurements includes a need for mechanical coupling between the transducer and the object being scanned. This coupling is generally achieved with a liquid medium, for example. Such a need for mechanical coupling can make it unpractical for some applications. However, advances in transducer design have helped to overcome the coupling problem. Two such advances include, for example: 1) electromagnetic-acoustic transducers (EMAT) and 2) air-coupled transducers.

Electromagnetic-acoustic transducers (EMAT) act through different physical principles and do not involve a couplant. A coil and magnet structure generate the ultrasonic waves within the object being scanned without requiring physical contact. EMATs are designed to excite complex wave patterns and polarizations that would be difficult to realize with fluid coupled piezoelectric probes.

Air-coupled transducers, as the name implies, use air as a couplant. However, a limitation of air-coupled transducer techniques is the high signal loss at solid-to-air and air-to-solid interfaces due to acoustic impedance mismatch. Recent efforts focused on reducing the impedance mismatch between piezoelectric ceramics and air or gases and have been successful at reducing signal losses.

Another ultrasonic technique that has seen use is Resonant Inspection. This NDT technique is a whole-body resonance inspection that can be used for inspecting mass-produced components. A single test can inspect a complete lot of components without the need for scanning, immersion in liquids, or use of couplant.

Disclosed herein are exemplary systems and methods for screening people involving acoustic and ultrasonic waves. The systems can use air-coupled transducers or electromagnetic-acoustic transducers (EMAT) to eliminate a couplant between the subject and the screening device. In one embodiment, the system can operate at frequencies between 15 KHz and 500 MHz±10%. The systems described herein can exploit detection and identification techniques previously used with electromagnetic radiation and apply them with ultrasonic waves, which can be safer for human use and lower cost to implement.

Figure 2:
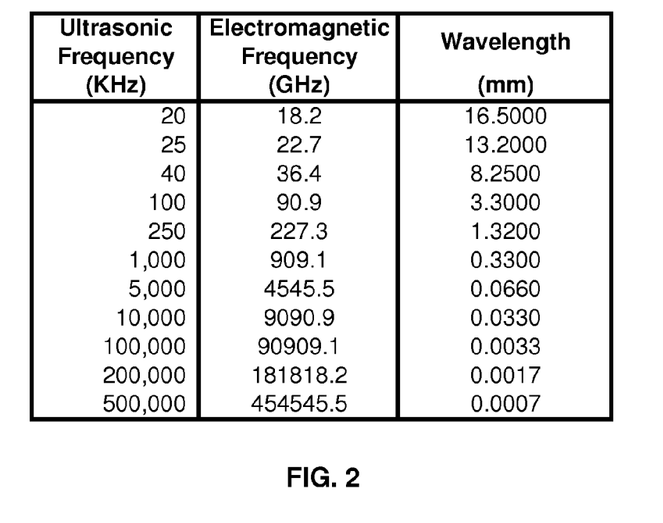
FIG. 2 shows a table of frequency equivalence for electromagnetic and ultrasonic waves for the same wavelength.

FIG. 2 shows a table of frequency equivalence for electromagnetic and ultrasonic waves for the same wavelength. An ultrasonic system operating at 100 KHz has the same wavelength (0.33 mm) as radar operating at 91 GHz, giving it many of the same properties, but offering some advantages, for example, being safer to use and costing less than similar radar systems. The ultrasonic sensor frequency can be chosen based on several factors, including size, amount of penetration and propagation range. The systems can operate in, for example, a pulse-echo mode or in a through-transmission mode.

Figure 3:
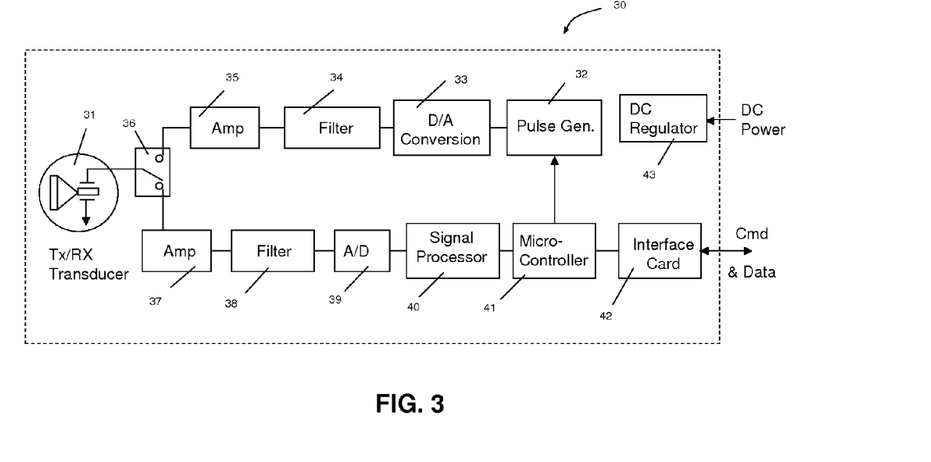
FIG. 3 shows a block diagram of an exemplary pulse-echo mode sensor.

FIG. 3 shows a block diagram of an exemplary pulse-echo mode sensor 30, where the ultrasonic transducer 31 acts as both an emitter and receiver. The ultrasonic transducer operates by applying a high voltage pulse, which can last for a short time, e.g., for a few microseconds, and then the system listens for the echoes for a short time, e.g., a few milliseconds, depending on the range of operation. The acoustic/ultrasonic sensor 30 can include a digital pulse generator 32 that creates pulses at the desired frequency, pulse width and pulse repetition. The generated pulses can then be sent to a digital-to-analog converter 33 that transforms the digital pulses into analog signals. The analog signals can then be passed through a filter 34 to remove unwanted harmonics and spurious signals. The filtered signals can then be amplified by the transmitter amplifier 35 and passed on to a Transmit/Receive switch 36 that controls the flow of signals in and out of transducer 31.

Transducer 31 converts the electrical signals into acoustic/ultrasonic waves that propagate to the target and a portion of the acoustic/ultrasonic signal propagates back to the transducer. The reflected acoustic/ultrasonic waves vibrate the piezoelectric crystal within the ultrasonic transducer 31 and generate voltages that can be amplified in the receiver amplifier 37. The amplified signals from the receiver can then be passed through filter 38 that removes unwanted signals and noise. The filtered signals can then be sent to the analog-to-digital converter (A/D) 39 that converts them to digital format. The digital signals can then be processed by signal processor 40 to extract amplitude, phase and other characteristics that can be used for creating images and detecting concealed objects. In another embodiment, an analog threshold circuit can be used instead of a digital signal processor A micro-controller 41 can be used to synchronize system operation and generate internal commands and communication. An interface card 42 can be used to communicate with external devices and to transfer image data to an external display (not shown). The sensor can also include a DC signal regulator and conditioner 43 to generate internal voltages.

Figure 4:
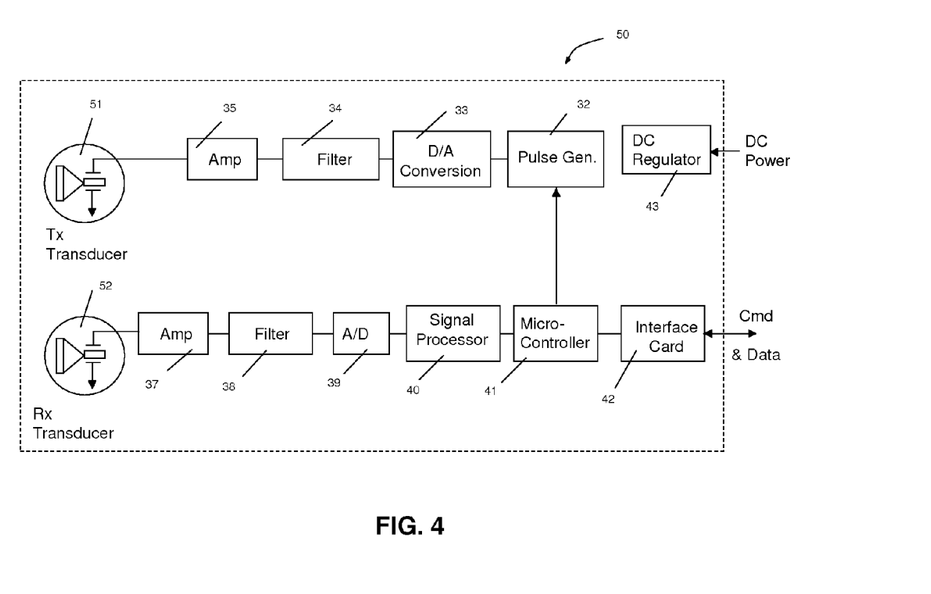
FIG. 4 shows a block diagram of an exemplary through-transmission mode sensor.

FIG. 4 shows a block diagram of an exemplary through-transmission mode sensor 50, where two ultrasonic transducers can be used; one transducer 51 generates the transmit wave and the other transducer 52 receives the wave. This type of transducer arrangement supports simultaneous transmit/receive mode of operation such as frequency modulated continuous wave (FMCW). The rest of the sensor components are similar to those described for the pulse-echo mode.

Figure 5:
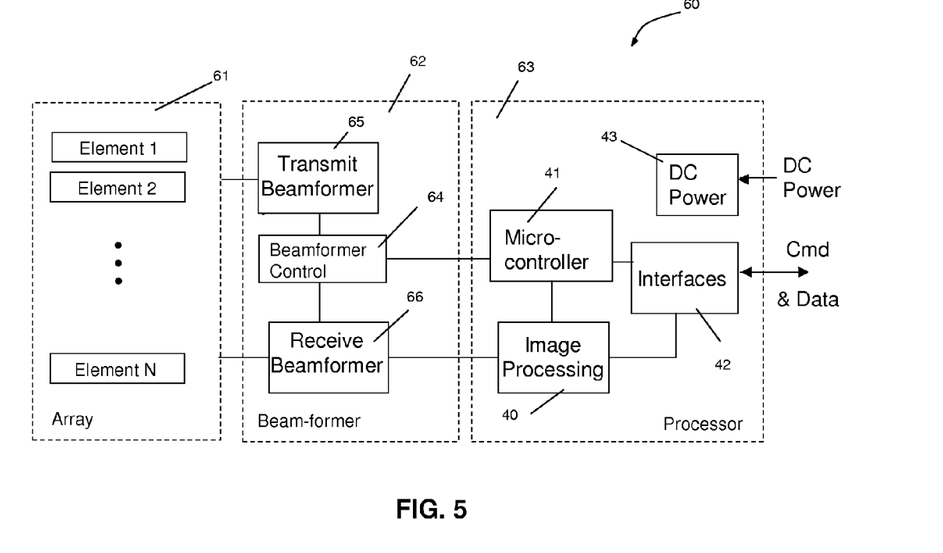
FIG. 5 shows a block diagram of an exemplary acoustic/ultrasonic array system.

FIG. 5 shows a block diagram of an acoustic/ultrasonic array system 60. The system can include a one-dimensional or two-dimensional array 61 of acoustic or ultrasonic sensors, including the transducers, the transmitter and receiver amplifier, filters and switches, a beam-forming section 62, and a processor section 63. The processor section 63 is similar to what was described for the single sensor systems. The beam-forming section 62 can include a controller 64 to generate digital control signals for the transmit beam-former 65 and the receiver beam-former 66.

Figure 6:
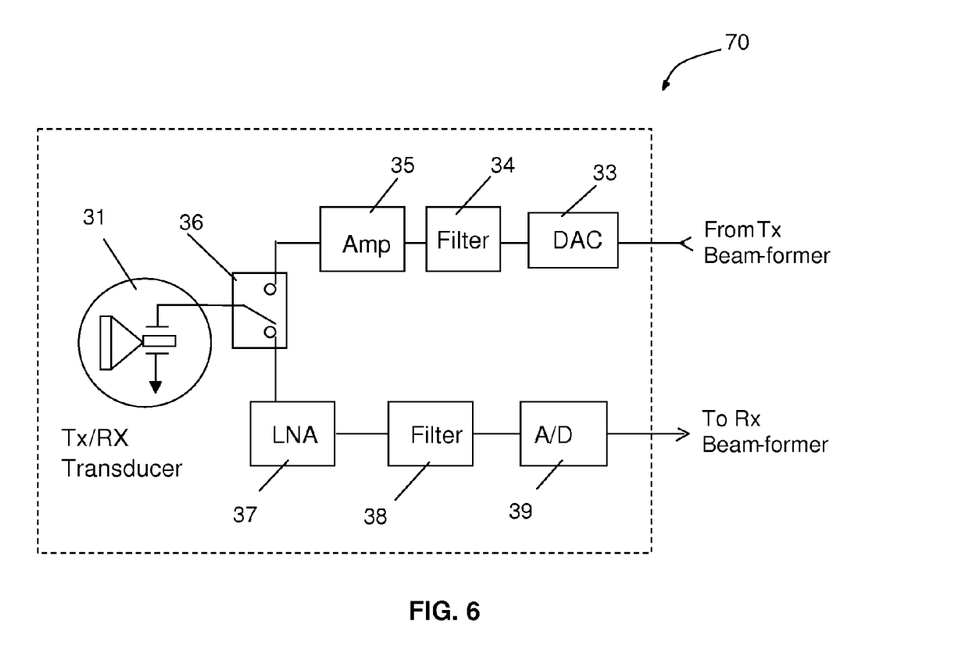
FIG. 6 shows an element of an exemplary sensor array.

FIG. 6 shows one element 70 of an exemplary sensor array. The front-end is similar to what was described for the single pulse-echo mode sensor. Digital transmit signals can be sent from the transmit beam-former to the D/A converter 33 of each sensor element. The received echoes from each sensor elements can be amplified, filtered and digitized and sent to the receive beam-former in digital form.

Figure 7:
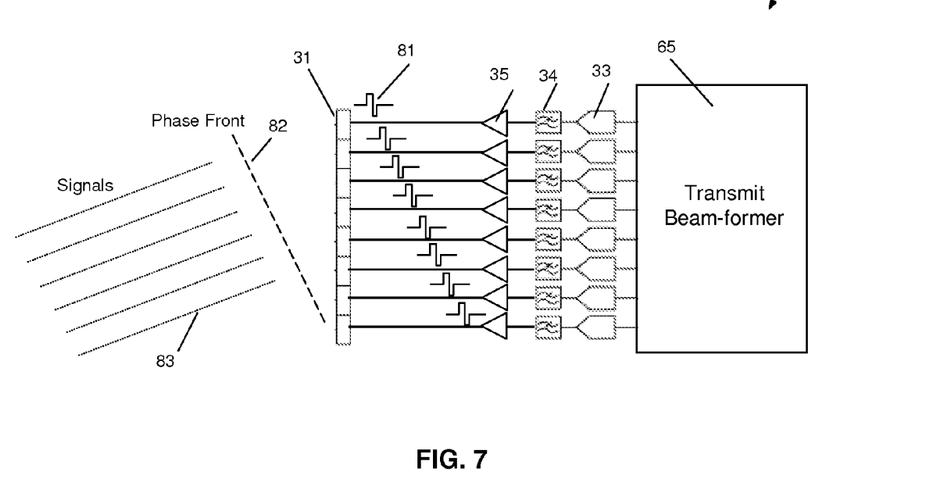
FIG. 7 illustrates an exemplary beam scanning function.

FIG. 7 illustrates an exemplary beam scanning function 80. The transmit beam-former 65 can create pulses 81 for each of the array transducers 31. By inducing delays in the pulse generation process, the beam former can effectively create a phase front 82 that directs the acoustic/ultrasonic energy in a desired direction within about a +/−70 degree angle from a line that is normal to the face of the array. Yet another method of creating a desired wave front is to introduce a phase delay for each element of the array.

Figure 8:
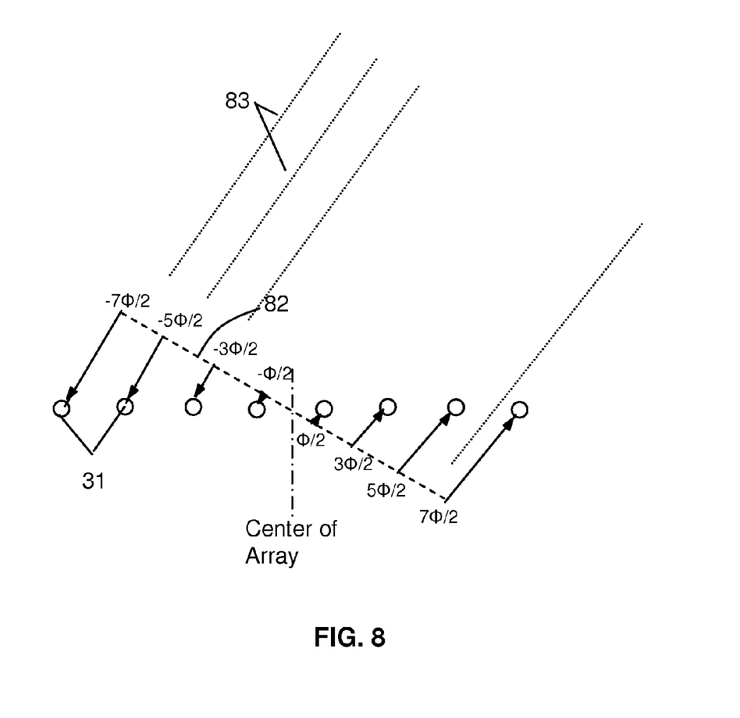
FIG. 8 shows a phase distribution across an exemplary 8-element array.

FIG. 8 shows a phase distribution across an 8-element array. The center of the array is the reference with zero phase and elements in the adjacent spaces can be shifted in phase according to the following:

$$\phi = 2\pi d \sin(\theta)/\lambda$$

where d is the distance between the array elements, θ is the scan direction (beam angle) and λ is the wavelength.

Figure 9:
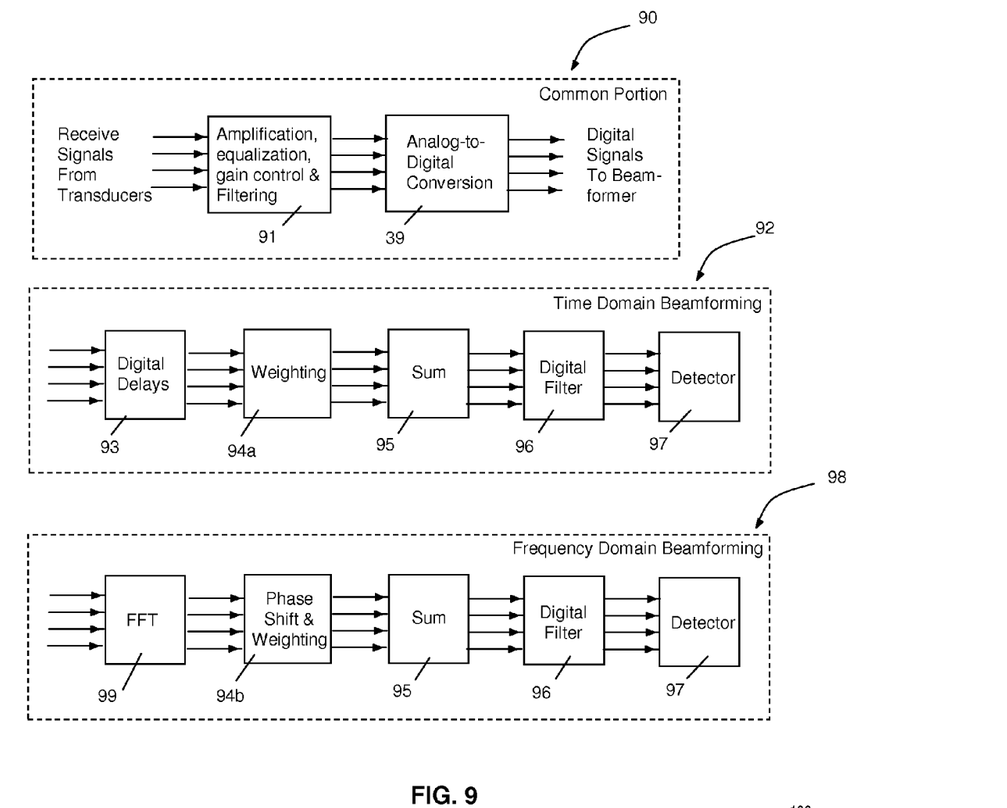
FIG. 9 shows two exemplary methods of performing receive beam forming.

On the receive side, the receive beam-former can introduce a time delay or a phase delay through digital processing. FIG. 9 shows two exemplary methods of performing the receive beam forming: time domain 92 and frequency domain 98. The top portion 91 of the block diagram shows a common portion of the receive path that includes signal amplification, filtering and equalization 91, and analog-to-digital conversion 39.

The time domain beam forming 92 can include digital delay 93, amplitude weighting 94a (using weighting coefficients such as, for example, Taylor or Hamming), summing of the signals 95, digital filtering 96, and detection 97.

The frequency domain beamforming 98 can include transformation of the data into the frequency domain using, for example, Fast Fourier transforms (FFT) 99. A phase shift can be calculated and applied to the frequency domain data as part of the weighting process 94b. The rest of the beamforming processing is similar to the time domain process previously discussed.

Figure 10:
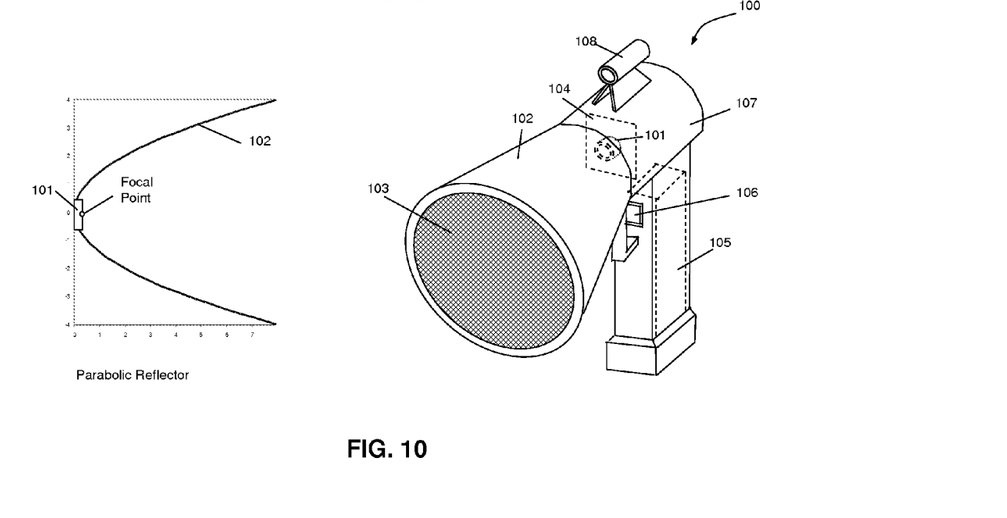
FIG. 10 shows an exemplary system including a handheld battery operated screening device.

FIG. 10 shows an exemplary embodiment that involves the use of a handheld screening device 100. An exemplary screening device 100 may be battery operated, for example. The device 100 can include at least one transducer 101 that may be of the type where the transducer acts as both an emitter and receiver or the type where there are separate transmit and receive transducers. There is also an acoustic/ultrasonic antenna aperture 102 operatively connected to the transducer 101 and configured to focus the transmitted acoustic/ultrasonic signal to create a narrow beam in the target area and to receive an acoustic/ultrasonic signal reflected from an object in the target area. The antenna/aperture 102 can include a parabolic reflector dish 102. The exemplary system can further include a cover, e.g., an acoustic transparent cloth 103 covering the opening of the reflector, a pulse generator, a data acquisition and signal processor board 104, a rechargeable battery 105, a push-to-operate button 106 and a plastic or metal housing 107. An external laser pointer or rifle scope 108 may be attached to the outside housing to help the operator aim the beam.

This system can be used to remotely screen people for hidden objects. For example, the operator can point the beam to a reference spot on the subject, which in one embodiment is preferably close to the neck area, and collect a few milliseconds of reference data by double-clicking on the push button. The reading can be temporarily stored in memory. The operator can then point the beam to other parts of the body. Hidden objects that generate responses different than the reference sample can be identified by an audible sound or a visible indication. For example, the larger the difference between the reference signal and newly collected signals, the higher the audible level. This system may be operated at distances ranging from, for example, 2 to 20 ft. The following table shows some exemplary system parameters for the handheld device:

| Parameter | Value |
| --- | --- |
| Frequency | 25 KHz |
| Bandwidth | 10 KHz |
| Pulse width | 300 μsec |
| Pulse Repetition Frequency (PRF) | 30 Hz |
| Beam-width | 3 deg |
| Range Resolution | 5 cm |
| Cross Range Resolution | 5 cm @ 1 m range |
| Min Range | 0.7 m |
| Max Range | 5.7 |
| A/D Sampling Rate | 6.66 KHz |

The operating frequency can be chosen to maximize wave penetration through clothing. Higher operating frequencies up to, for example, 200 KHz, may be used. Although these higher frequencies may provide less penetration of clothing, they can provide an added advantage of reducing the size of the reflector, reducing the size of the illuminated spot and, in some cases, increasing the detection range.

Another embodiment can involve the use of one-dimensional or two-dimensional arrays of ultrasonic transducers that can be configured as a planar phased array. The system shown in FIG. 11 can include transducers, beam steering controller, pulse generator, data acquisition hardware, signal and data processor board 111, and a plastic or metal housing 112. The array may have as few as two transducers or as many as thousands. The array can be designed to have an electronically scanned beam 113; therefore the element spacing 114 can be optimized for a half wavelength ($\lambda/2$).

Figure 11:
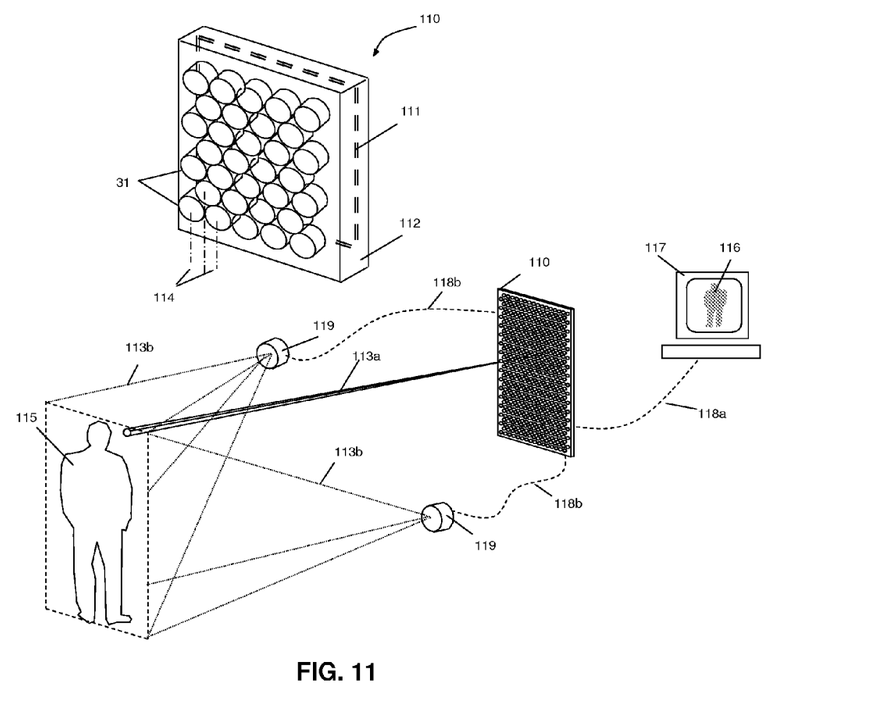
FIG. 11 shows an exemplary planar phased array system.

Because the size of the transducer housing can be approximately equal to a wavelength, the rows of elements can be offset by half of the diameter of a transducer. The angle of the beam can be changed by introducing successive delays between array elements. To improve the frame rate, the array can be configured to scan in the horizontal or vertical dimension and to stare in the other direction. If the beam 113a is configured to scan horizontally only, the entire subject 115 can be scanned in a relatively short period of time, for example, less then 1 second, and generate a high resolution two-dimensional ultrasonic image 116 on a remote display 117.

The connection 118a between the sensor array 110 and the display can be wired or wireless using, for example, commercially available IEEE Standard IEEE Standard 802.11 wireless links. The transmit transducers 119 do not have to be closed to the receive array 110. The transmit transducers can produce a wide beam 113b that can illuminate the subject 115 from different directions. The transmit transducers can be connected to processor board 111 inside the array via connections 118b.

Two-dimensional data can allow for potential isolation of concealed objects from a body. The system can be used in a non-intrusive manner. The system array may be packaged in a thin frame that may be mounted on a wall or in hallways and walk ways. Multiple systems can be used to scan subjects from different angles. The table below shows some exemplary parameters for the array system based on attempting to detect, for example, a 3 inch×3 inch concealed object from up to a distance of 10 ft. Different array configurations and operational frequencies may be used.

| Parameter | Value |
| --- | --- |
| Frequency | 40 KHz |
| Bandwidth | 10 KHz |
| Pulse width | 300 μsec |
| Pulse Repetition Frequency (PRF) | 55 Hz |
| Array size | 0.26 m × 1.04 m |
| Near Field | 2 m |
| Number of elements | 2048 (32 × 64) |
| Beam-width | 1.6 deg |

-continued

| Parameter | Value |
| --- | --- |
| Range Resolution | 5 cm |
| Cross Range Resolution | 3 cm @ 1 m range |
| Min Range | 0.7 m |
| Max Range | 3 m |
| Frame Rate | 2 Hz |

Figure 12:
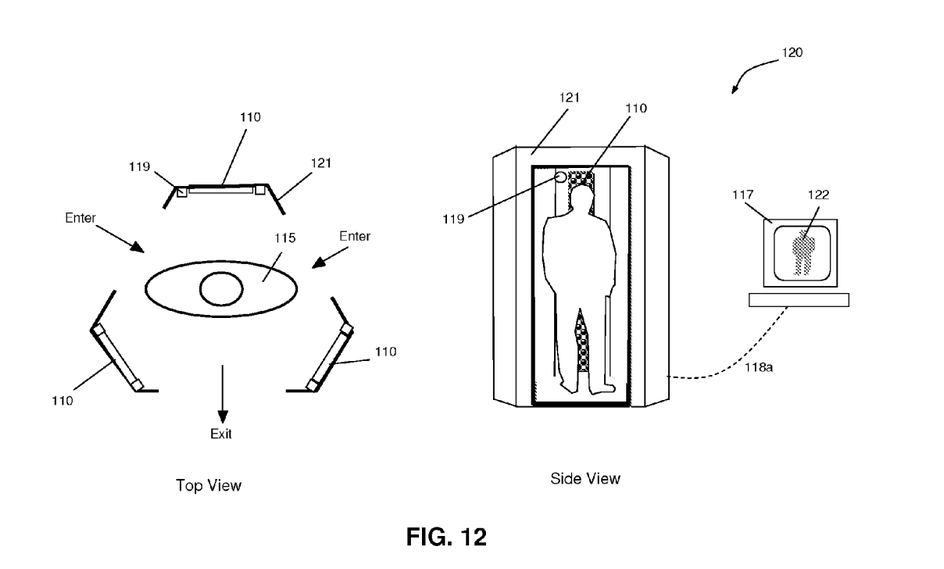
FIG. 12 shows an exemplary ultrasonic portal.

FIG. 12 shows exemplary system 120 that involves the use of an enclosure (e.g., a portal) to screen subjects in a semi-controlled environment by creating 3D images. The enclosure 121 can have one or more points of entry and a point of exit for the subject 115. In addition to the enclosure, the system can include one or more transmit transducers 119, one or more receive transducer arrays 110 as previously described, a display 117 (for example, a PC or a laptop computer) to display the 3D images 122, and interface 118a between the portal and the display.

One or more transmitters can be used to illuminate the subject from different directions to cover 360 degrees. The table below shows exemplary parameters for a portal system that that can generate 3D images with approximately 1 inch resolution.

| Parameter | Value |
| --- | --- |
| Frequency | 25 KHz |
| Bandwidth | 10 KHz |
| Pulse width | 300 μsec |
| Pulse Repetition Frequency (PRF) | 150 Hz |
| Array size | 0.25 m × 2 m |
| Near Field | 1.2 m |
| Number of elements | 2048 (32 × 64) |
| Beam-width | 2.7 deg |
| Range Resolution | 5 cm |
| Cross Range Resolution | 3 cm @ .6 m range |
| Min Range | 0.3 m |
| Max Range | 1.2 m |
| Frame Rate | 5 Hz |

Figure 13:
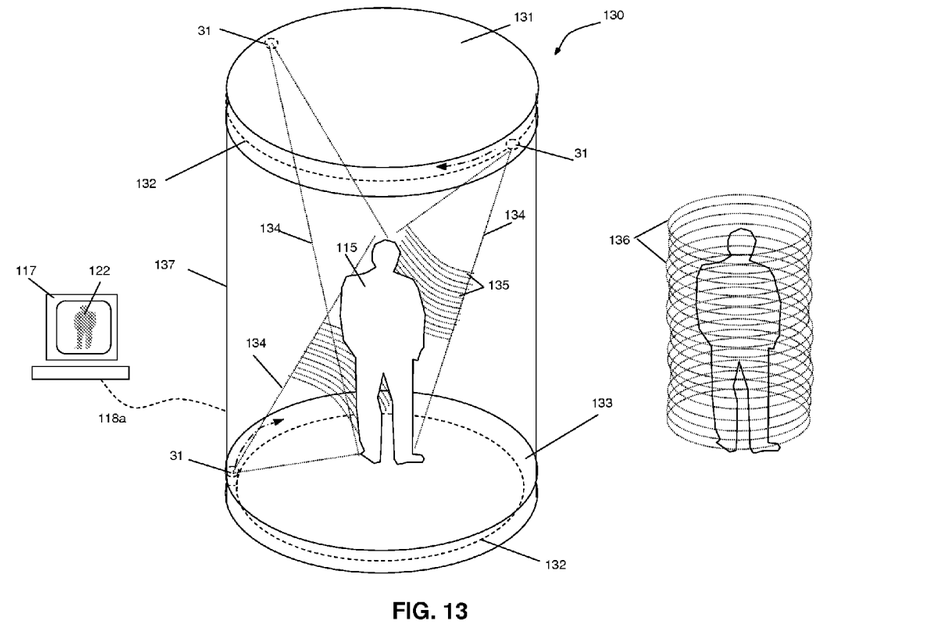
FIG. 13 shows an exemplary circular portal system.

FIG. 13 shows an exemplary circular portal system 130 with a small number (for example, two or three) of transducers mounted on a mechanical scanning platform 132, which rotates the sensors 31 around the subject, on a top dome 131 or a bottom platform 133. The top dome can be supported by a structure 137 made of, for example, glass or other transparent material. One or more sensors 31 can illuminate the subject 115 within the scanned area with beams 134.

Reflected energy from objects within the field of view can be collected through range slicing 135. This method can progressively scan a 360-degree field of view and compose the imaged area with a series or circular rings 136. An image may be composed with a series of diametrically-scanned lines. The azimuth of each diametric line can be determined by the angular position of the sensor assembly. Scanning of each line can be achieved by the angular movement of the sensor.

The angular movement of the sensor can also be exploited to improve azimuth resolution by creating a synthetic aperture through coherent processing of the diametric lines using for example Fast Fourier Transform (FFT). This will be discussed in detail in the next few paragraphs.

Data from the ultrasonic array can be incorporated in an image generation system that allows for the acquisition of high resolution three dimensional ultrasonic images 122 of the subject and presentation on display 117 in a relatively short time, for example, less than 2 seconds. The three-dimensional range and power spectra information can allow for potential isolation of concealed objects from the body. The connection 118a between the portal 130 and the display may be wired or wireless using commercially available IEEE Standard 802.11 wireless links, for example.

Three-dimensional image generation techniques include, for example: 1) ultra-wide band (UWB) range resolution, 2) synthetic aperture and 3) interferometry. In the down-range dimension, resolution, $\Delta r$, can be related to the signal bandwidth B as follows:

$$\Delta r = c/2B$$

Where B is the acoustic bandwidth and c is the speed of sound.

High resolution may be obtained with, for example, a short-duration pulse or by a coded wide-bandwidth signal, such as a linear FM chirp or a step frequency sequence, with pulse compression processing. An ultrasonic sensor using a wideband (e.g., 10 KHz bandwidth) waveform can achieve about a 0.7 inch range resolution. In another embodiment, using 5 KHZ bandwidth can achieve about 1.4" range resolution.

As is known, the angular resolution capability of a monostatic sensor can be determined by its beamwidth. Therefore, linear resolution capability in a cross-range direction of a wideband sensor can usually be worse than resolution capability in range. Cross-range resolution in a monostatic sensor can be determined by the product of the range and beamwidth, $\theta_B$. The beamwidth can be determined by the size of the aperture, d, and thus cross-range resolution can be given by:

$$\Delta x = R\theta_B = R\lambda/d$$

Where
R is range to the target
$\lambda$ is the wavelength
d is the aperture diameter (for a circular aperture)

As beamwidths can be determined by the transducer size, a 25 mm size at 40 KHz frequency can provide, for example, an 18 degree azimuth beam width and nearly a 12-inch resolution at 1 m distance. This resolution may, however, be inadequate for detection of small concealed objects. Solutions could include increasing the size of the aperture of the rotating sensor or using an array of sensors. An exemplary method uses the concept of synthetic aperture, where sensor motion around the subject is exploited to create a larger synthetic aperture that yields relatively finer resolution than is possible from a smaller physical aperture.

The theory of operation of synthetic aperture is known by those who are skilled in the art. Achieving fine azimuth resolution may be described from a Doppler processing viewpoint. An object's position along the path of motion can determine the Doppler frequency of its echoes. Objects ahead of the sensor produce a positive Doppler offset; targets behind the sensor produce a negative offset. As the sensor moves a distance it creates a synthetic aperture, echoes can be resolved into a number of Doppler frequencies. The object's Doppler frequency can determine its azimuth position. The Doppler shift can be given by:

$$f_d = (2v/\lambda)\cos(\theta)$$

Where v is the sensor velocity, $\theta$ is the off-velocity vector angle to the object, and $\lambda$ is the wavelength.

The Doppler spread across the beam can be given by taking the derivative of the Doppler equation shown above:

$$\Delta f_d = -(2v/\lambda)\sin(\theta)\Delta\theta$$

Using the previous example of a 25 mm transducer operating at 40 KHz and rotating around the subject at 3 m/sec, the resultant Doppler shift across the 18 degree beam is 215 Hz. If we were to collect 16 samples over the beam's angular coverage and process them using Fast Fourier transform (FFT) techniques, a synthetic aperture beamwidth of 1.1 degree (18 deg/16) can be achieved. The result can be a map of reflectivity (including both amplitude and phase) with a relatively small, e.g., about 1 inch, cross-resolution.

Figure 14:
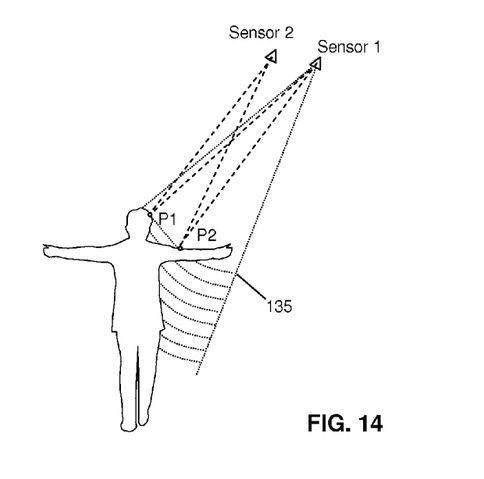
FIG. 14 shows an exemplary interferometry implementation for removing range ambiguity.

FIG. 14 shows an equal range ring that can not distinguish the return from a point (P1) on the subject's head and point (P2) on the subject's arm using a single sensor 1 only. A technique that helps resolve this ambiguity is interferometry. Even though a sensor image may display only amplitude data, an exemplary coherent imaging system can retain amplitude and phase information during data acquisition and subsequent processing. Interferometry exploits this coherence, and can use the phase measurements to infer differential range and range change in two or more sensors.

The phase difference can be sensitive to both viewing geometry and the height of the point. If the sensor's geometry is known to sufficient accuracy, then the height of each point can be inferred from the phase measurement. The measured quantity is the phase difference between the two sensors and can be directly proportional to the difference in range. Because the phase is a multiple of the value (0-2π radians), this can result in an ambiguity in range that can be resolved using known techniques, such as phase unwrapping. The table below shows exemplary parameters for a portal system that can generate 3D images with relatively high resolution, for example, better than 1 inch resolution.

| Parameter | Value |
| --- | --- |
| Frequency | 40 KHz |
| Bandwidth | 10 KHz |
| Pulse width | 1.6 msec |
| Pulse Compression | FM chirp |
| Transducer Aperture | 25 mm |
| Beam-width | 18 deg |
| Image Resolution | 1 × 1 inch |
| Min Range | 0.2 m |
| Max Range | 2.0 m |
| Dwell time | 6.1 msec |
| Scan rate | 180/sec |
| Range FFT | 128 |
| Azimuth FFT | 16 |
| Frame Rate | ½ Hz |

Another exemplary embodiment involves the use of multiple ultrasonic transducers to simultaneously scan multiple subjects in a wide area, such as a 50 m×50 m area, for example. These multistatic concepts are described in U.S. Provisional Application Ser. No. 61/047,182, filed Apr. 23, 2008, which is now co-pending U.S. patent application Ser. No. 12/233,063, filed Sep. 18, 2008, entitled "Multistatic Concealed Object Detection", the disclosures of which are incorporated herein by reference in their entirety. Wide area screening concepts leverage the spatial and geometric diversity of a multistatic network of ultrasonic sensors to deliver high resolution images. The ability to slice, in range, the screened area from different directions by multiple sensors can allow for the creation of tiny volume pixels (voxels) that form the basis for generating high resolution 3D images. This concept is similar to multistatic radar operation.

The transducers can be configured in such a way to be able to collect echoes from the volume being scanned. The transducers can collect high range resolution (HRR) profiles from different aspect angles around the screening area. Data from the ultrasonic array can be incorporated in suitable fast image generation techniques that allows for the acquisition of high resolution three-dimensional ultrasonic images of a subject in a relatively short time, for example, less than one second. The three-dimensional images can allow for potential isolation of concealed objects from the body.

The system can use known remote ultrasonic sensing and tomography software to perform the detection and screening functions. The techniques used in tomography were developed originally for medical imaging, to provide 2D cross-sectional images of a 3D object from a set of narrow X-ray views of an object over the full 360 degree of direction. The results of the received signals measured from various angles can then be integrated to form the image, by means of various known tomographic techniques. These techniques can include, for example, Filtered Back projection (FBP) and Time Domain Correlation (TDC).

Figure 15:
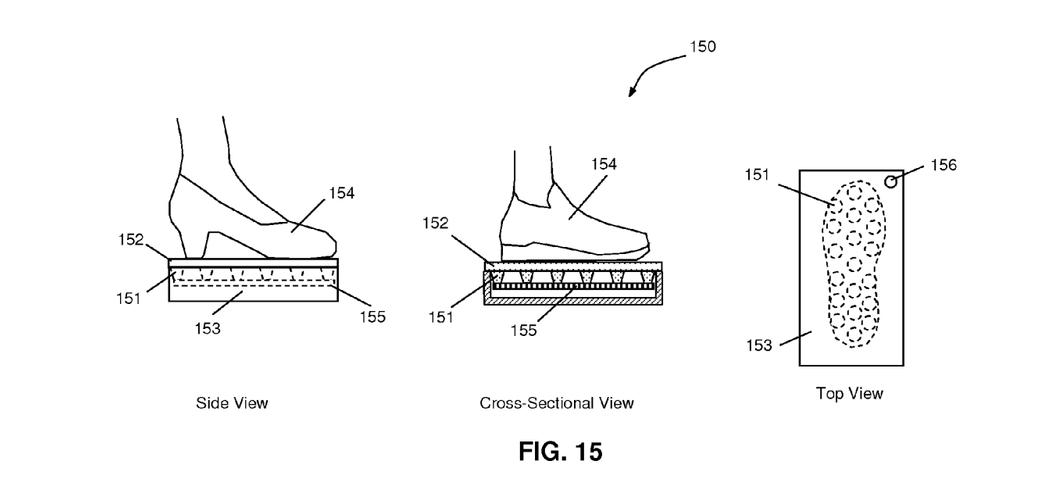
FIG. 15 shows an exemplary shoe scanner embodiment.

Another embodiment shown in FIG. 15 involves the use of an ultrasonic array to scan shoes without requiring their removal. The shoe scanning system 150 can include ultrasonic transducers 151 configured, for example, in the shape of a shoe print, mounted under a sheet of, for example, Rexolite or other low loss material 152 and supported by a low level stand 153. The subject can stand on the shoe print.

The transducers can interrogate the shoe material 154 and anything inside the shoe by sending and receiving ultrasonic pulses. The ultrasonic waves can provide a screening capability in that they can penetrate solid materials, including, for example, steel. The waves can propagate through the bottom of the shoe, to the inside the shoe and out from the top of the shoe. A signal processing board 155 can be used to analyze the returned echoes for the presence of hidden cavities within the shoe material or hidden objects within the shoe. The returned echoes can also be analyzed for consistency between, for example, each shoe in the pair of shoes. The analysis can generally involve looking at parameters such as sound speed, sound attenuation or scattering and the frequency content of echoes. These parameters can help to analyze and qualify material properties, including, for example, density, voids, and structure and orientation patterns. The scanning process can take only a few milliseconds, in one example. An indicator 156 (audio or visual) can be used to alert an operator for possible inconsistencies that can involve further manual screening.

Figure 16:
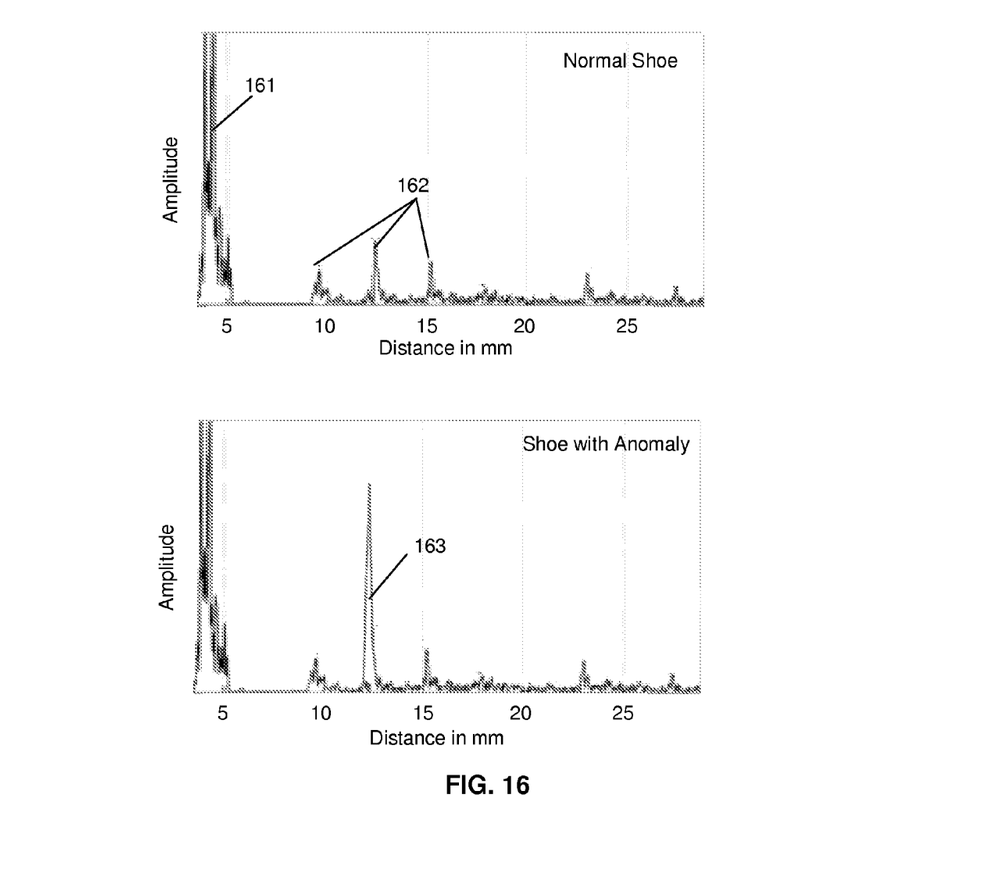
FIG. 16 shows examples of sample plots of shoe layer analysis.

FIG. 16 shows two exemplary sample plots of shoe layer analysis. One plot shows an example of a normal shoe and the second plot shows an example of a shoe with a hidden cavity. The normal profile shows the initial signal bounce 161, then reflections from multiple layers of material 162. The abnormal shoe shows a different profile, with a large reflection 163 in the layers, which can be indicative of a void in the material.

Another embodiment involves the use of one or more acousto-ultrasonic transducers to generate Lamb and Shear waves. Acousto-ultrasonic waves can differ from ultrasonic waves in that they can be used as a means of assessing anomalies (and other material attributes) distributed over substantial areas, rather than characterizing localized areas. Lamb and Shear waves may be used to irradiate the whole body and can propagate substantial distances.

Figure 17:
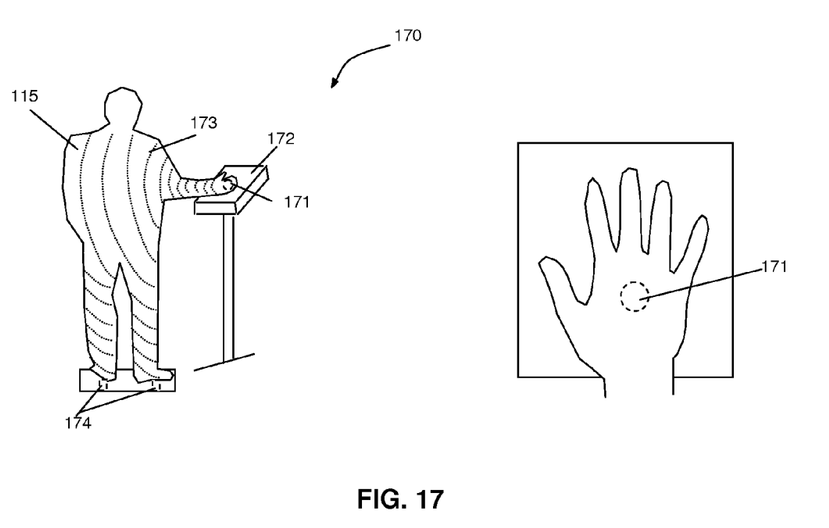
FIG. 17 shows an exemplary acousto-ultrasonic and resonant frequency system.

The system shown in FIG. 17 can include a transmitting transducer 171 mounted on a stand or a holding fixture 172 that generates a wave 173 that propagates along the body of the subject 115 simply by having the subject place a hand or foot on the transducers. The receiving transducers 174, which can be located preferably in opposite side of transmitting transducer (opposite hand or foot), receive the propagated waves. The received waves can be analyzed for inconsistencies that may be caused by, for example, a concealed object on a subject that can generate a different response that can be detected. Because sound-transmission properties of different materials vary, ultrasonic analysis can be a comparative process. Generally, a set of reference data representing the range of conditions for "clean" subject are stored. These reference properties can be used to compare them with collected data from the subjects.

Figure 18:
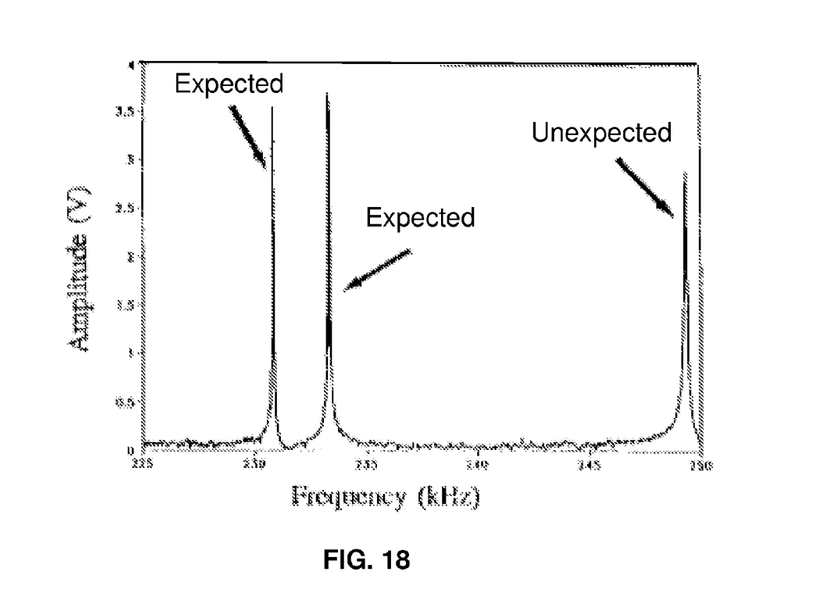
FIG. 18 shows an example of a frequency profile for an exemplary resonant frequency system.

Another embodiment may also involve the use of wideband resonant inspection. One or more transducers, acting as transmitters can generate a broadband wave that propagates through the body of the subject by having the subject place a hand or foot on the transducers. The ultrasonic wave excitations can sweep through individual frequencies over a band. The narrow band receiving transducer, which can be located preferably in an opposite side of the transmitting transducer (opposite hand or foot), can follow a swept sine-wave and measure the amplitude of vibration at a specific frequency of the transmitter. Additional transducers can be used to improve detection capability. A concealed object on the person can generate a different resonant spectrum that can be detected. FIG. 18 shows an example of a frequency profile that may be collected and analyzed by this embodiment.

The exemplary systems and methods can be used to detect, locate and identify concealed objects within an obscuring medium, such as a person's clothing or shoes, using acoustic and ultrasonic devices and methods. The methods of detections include contact and non-contact with the obscuring medium, proximity and remote sensing, and imaging and non-imaging techniques. The exemplary devices, methods and apparatus can determine dimensional, surface, contour, image, properties, and/or other information about a concealed object through acoustic and ultrasonic interrogation.

Further exemplary embodiments include systems and methods for remote and proximity detection of concealed objects under a person's clothing using an acoustic or ultrasonic handheld device. This method involves the differences in echoes between a reference area on the body and other areas where concealed objects may be present.

Other embodiments include systems and methods for cooperative and non-cooperative, proximity and remote acoustic and ultrasonic imaging of a subject and signal processing and data analysis to detect the presence of hidden objects.

An exemplary method can include the use of two-dimensional arrays of ultrasonic transducers operating in a phased array fashion to electronically scan a beam across a person from a distance and generate high resolution images from which hidden objects can be detected. Another exemplary method includes screening subjects inside an enclosure sufficiently large to enable free ingress and egress of the subject.

An acoustic or ultrasonic transducer can be configured to induce sound waves and a receiver can be configured to detect reflected waves from a subject. A system can include a way of creating images and analyzing the detected signals to determine the presence of concealed objects. Another exemplary method includes the use of multiple ultrasonic transducers to simultaneously scan multiple subjects in a wide area. This screening method can leverage the spatial and geometric diversity of a multi-static network of ultrasonic sensors. The received signals measured from various angles can be integrated to form 3D images of subjects in the scanned area, by way of various known tomographic techniques.

Another embodiment involves the use of acoustic and ultrasonic devices and methods to detect hidden objects by interrogating and analyzing material properties. An exemplary method can for screening, for example, shoes, can include ultrasonic scanning and collection and analysis of material properties inside the shoe without requiring removal of the shoes. The ultrasonic waves can propagate through the bottom of the shoe, to the inside the shoe and out from the top of the shoe. A signal processor can be used to analyze the returned echoes for the presence of hidden cavities within the shoe material or hidden objects within the shoe. The physical structures of different material can affect the propagation of sound waves.

Another exemplary method can include screening a subject by inducing an ultrasonic wave within the human body through, for example, hand or foot contacts and measuring ultrasonic resonance originating from the human body and from any hidden objects in proximity to the surface of the human subject. The resonance spectrums can be analyzed to determine the presence of hidden objects around the human subject.

The above description is presented to enable a person skilled in the art to make and use the systems and methods described herein, and it is provided in the context of a particular application and its requirements. Various modifications to the embodiments will be readily apparent to those skilled in the art, and the generic principles defined herein may be applied to other embodiments and applications without departing from the spirit and scope of the claims. Thus, there is no intention to be limited to the embodiments shown, but rather to be accorded the widest scope consistent with the principles and features disclosed herein.

What is claimed is:

1. A method of detecting a remote object concealed by a subject using a portable acoustic/ultrasonic detection system, the method comprising:
   collecting, by a portable acoustic/ultrasonic detection system, reference data from a reference spot on a person located from 2 to 20 feet from the detection system, wherein said detection system comprises:
   a signal generator configured to output an electrical signal;
   at least one acoustic/ultrasonic transducer configured to convert the electrical signal into an acoustic/ultrasonic signal, transmit the acoustic/ultrasonic signal, receive a reflected acoustic/ultrasonic signal from an object and convert the reflected acoustic/ultrasonic signal into a received electrical signal, wherein the transducer is at least one of an air-coupled transducer and an electromagnetic acoustic transducer;
   an acoustic/ultrasonic antenna aperture operatively connected to the transducer and configured to focus the transmitted acoustic/ultrasonic signal to create a narrow beam the target area;
   a processor configured to extract object information from the received electrical signal; and
   collecting, by the portable acoustic/ultrasonic detection system, object data from an object hidden on a different spot on the person;
   comparing the reference data to the object data; and
   determining that the person is hiding an object based on the comparison.

2. The method of claim 1, wherein the signal generator is configured to produce signals at frequencies from about 15 KHz to about 500 MHz.

3. The method of claim 1, comprising:
   an aiming device to assist in aiming the transmitted acoustic/ultrasonic signal in the target area.

4. The method of claim 3, wherein the aiming device is at least one of a laser or an optical device.

5. The method of claim 1, wherein the object indicator includes an audible indication.

6. The method claim 1, wherein the electrical signal created by the signal generator is a digital pulse.

7. The method of claim 6, comprising:
 a digital-to-analog converter configured to convert the digital pulse into an analog electrical signal.

8. The method of claim 1, comprising:
 an analog-to-digital converter configured to convert the received electrical signal into a digital signal.

9. The method of claim 1, wherein the acoustic/ultrasonic transducer has a bandwidth of 5 KHz or greater.

10. The method of claim 1, wherein the acoustic/ultrasonic antenna aperture is configured to receive an acoustic/ultrasonic signal reflected from an object in the target area.

* * * * *